US012123222B2

(12) United States Patent
Schroeder et al.

(10) Patent No.: US 12,123,222 B2
(45) Date of Patent: Oct. 22, 2024

(54) ELECTRONIC LOCKING APPARATUS FOR A SWING DOOR

(71) Applicant: JANUS INTERNATIONAL GROUP, LLC, Temple, GA (US)

(72) Inventors: Curtis Leon Schroeder, Carrollton, GA (US); Yannick Funk, Dummondville (CA)

(73) Assignee: JANUS INTERNATIONAL GROUP, LLC, Temple, GA (US)

(*) Notice: Subject to any disclaimer, the term of this patent is extended or adjusted under 35 U.S.C. 154(b) by 133 days.

(21) Appl. No.: 17/278,373

(22) PCT Filed: Sep. 24, 2018

(86) PCT No.: PCT/US2018/052406
§ 371 (c)(1),
(2) Date: Mar. 22, 2021

(87) PCT Pub. No.: WO2020/068030
PCT Pub. Date: Apr. 2, 2020

(65) Prior Publication Data

US 2021/0355710 A1 Nov. 18, 2021

(51) Int. Cl.
*E05C 3/00* (2006.01)
*E05B 47/00* (2006.01)
(Continued)

(52) U.S. Cl.
CPC ...... *E05B 47/0004* (2013.01); *E05B 63/0052* (2013.01); *E05B 63/24* (2013.01);
(Continued)

(58) Field of Classification Search
CPC ......... Y10T 292/1047; Y10T 292/1082; Y10T 292/696; Y10T 292/699; Y10T 292/702;
(Continued)

(56) References Cited

U.S. PATENT DOCUMENTS 420,834 A * 2/1890 Seib .................... E05B 47/0047 292/341.16
5,570,915 A * 11/1996 Asadurian ........... E05B 17/0037 292/216

(Continued)

FOREIGN PATENT DOCUMENTS

DE 2838175 A1 3/1980
DE 19821594 A1 * 11/1999 ............... B60N 2/43

(Continued)

OTHER PUBLICATIONS

International Preliminary Report on Patentability for International Patent Application No. PCT/US2018/052406; Apr. 1, 2021.

(Continued)

*Primary Examiner* — Carlos Lugo
(74) *Attorney, Agent, or Firm* — Barnes & Thornburg LLP; Jason A. Bernstein; Steven D. Shipe

(57) ABSTRACT

An electronic locking apparatus for an entryway, having a linkage coupled to an entryway frame case, and a solenoid associated with the case, the solenoid is configured to selectively engage with the linkage. The linkage is movable between a locked position blocking movement of a latch bolt from the latched position to the unlatched position and an unlocked position allowing movement of the bolt to the unlatched position.

20 Claims, 8 Drawing Sheets

(51) Int. Cl.

| | |
|---|---|
| ***E05B 63/00*** | (2006.01) |
| ***E05B 63/24*** | (2006.01) |
| ***E05C 1/04*** | (2006.01) |
| ***E05C 3/12*** | (2006.01) |
| ***E05C 3/24*** | (2006.01) |
| *G07C 9/00* | (2020.01) |
| *G07C 9/20* | (2020.01) |

(52) U.S. Cl.
CPC ................ *E05C 1/04* (2013.01); *E05C 3/006* (2013.01); *E05C 3/12* (2013.01); *E05C 3/24* (2013.01); *E05B 2047/0067* (2013.01); *G07C 9/00309* (2013.01); *G07C 9/20* (2020.01)

(58) Field of Classification Search
CPC ...... E05B 63/24; E05B 63/0052; E05C 3/006; E05C 3/12; E05C 3/24; Y10S 292/29
See application file for complete search history.

(56) References Cited

U.S. PATENT DOCUMENTS

| | | | | |
|---|---|---|---|---|
| 6,378,920 | B1 * | 4/2002 | Ostrowski ............... | E05B 83/16 292/216 |
| 8,029,029 | B2 * | 10/2011 | Terhaar ................... | E05B 81/14 292/216 |
| 8,047,582 | B1 * | 11/2011 | Rodgers .................... | E05C 3/24 292/201 |
| 8,516,864 | B2 * | 8/2013 | Greiner ............... | E05B 47/0607 292/201 |
| 8,789,859 | B2 | 7/2014 | Curtis et al. | |
| 9,777,512 | B2 | 10/2017 | Curtis et al. | |
| 9,810,000 | B2 | 11/2017 | Schroeder | |
| 2005/0067840 | A1 | 3/2005 | Koveal et al. | |
| 2009/0315341 | A1 | 12/2009 | Willcox | |
| 2014/0319851 | A1 | 10/2014 | Curtis et al. | |
| 2017/0067271 | A1 | 3/2017 | Schroeder | |

FOREIGN PATENT DOCUMENTS

| | | | |
|---|---|---|---|
| DE | 20015309 | U1 | 2/2001 |
| DE | 10312292 | A1 | 9/2004 |
| EP | 2963211 | A1 | 1/2016 |
| FR | 2922933 | A1 | 5/2009 |
| KR | 20130027685 | A * | 3/2013 |
| KR | 101253312 | B1 | 4/2013 |

OTHER PUBLICATIONS

Extended European Search Report for European Patent Application No. 18935949.0; Apr. 20, 2022.
Search Report and Written Opinion for International Application No. PCT/US2018/052406; Jan. 17, 2019.
Office Action; European Patent Application No. 18935949.0; Mar. 31, 2023.

* cited by examiner

ELECTRONIC LOCKING APPARATUS FOR A SWING DOOR

PRIORITY CLAIM

This patent application is a U.S. National Phase of co-pending International Patent Application No. PCT/US2018/052406, filed Sep. 24, 2018, the disclosure of which is incorporated herein by reference in its entirety.

FIELD

The present disclosure relates to locks, and particularly to locks for doors. More particularly, the present disclosure relates to an electronic lock for use with swing doors.

BACKGROUND

Electronic door locks exist for various kinds of doors, such as, but not limited to roll up doors. See, for example, U.S. Pat. Nos. 8,789,859; 9,810,000; and, 9,777,512, all commonly assigned to the assignee of the present application. There is a need for an improved electronic door lock for swing-type doors.

SUMMARY

According to the present disclosure, an entryway includes a frame and a swing door coupled to the frame for swinging movement relative to the frame between an opened position extending away from an opening of the frame and a closed position covering the opening. A latch coupled to the door engages with the door and the frame to block movement of the swing door relative to the frame from the closed position to the opened position at the selection of a user.

In illustrative embodiments, an electronic locking apparatus is coupled to the frame. The electronic locking apparatus is configured to engage with a bolt of the latch to block access through the entryway by an unauthorized user. The electronic locking apparatus is movable between a locked position blocking movement of the bolt relative to the frame and an unlocked position allowing the bolt to move relative to the frame at the selection of an authorized user.

In illustrative embodiments, the electronic locking apparatus includes a case, a linkage coupled to the case, and a solenoid coupled to the case. The case is coupled to the frame to hold the locking apparatus on the frame. The linkage engages with the bolt and operation of the solenoid by an authorized user allows the linkage to move from the locked position to the unlocked position.

In illustrative embodiments, the linkage includes a catch, a cam, a trigger, and a release lever. The bolt enters the locking apparatus as a user moves the bolt toward the locking apparatus. In the locked position, the catch engages with the cam and the cam engages with the release lever to block movement of the bolt relative to the locking apparatus. The solenoid moves the release lever to allow the cam and catch to rotate and allow the bolt to move away from the locking apparatus in the unlocked position.

BRIEF DESCRIPTION OF THE DRAWINGS

The drawings disclose exemplary embodiments in which like reference characters designate the same or similar parts throughout the figures of which.

Figure 1:
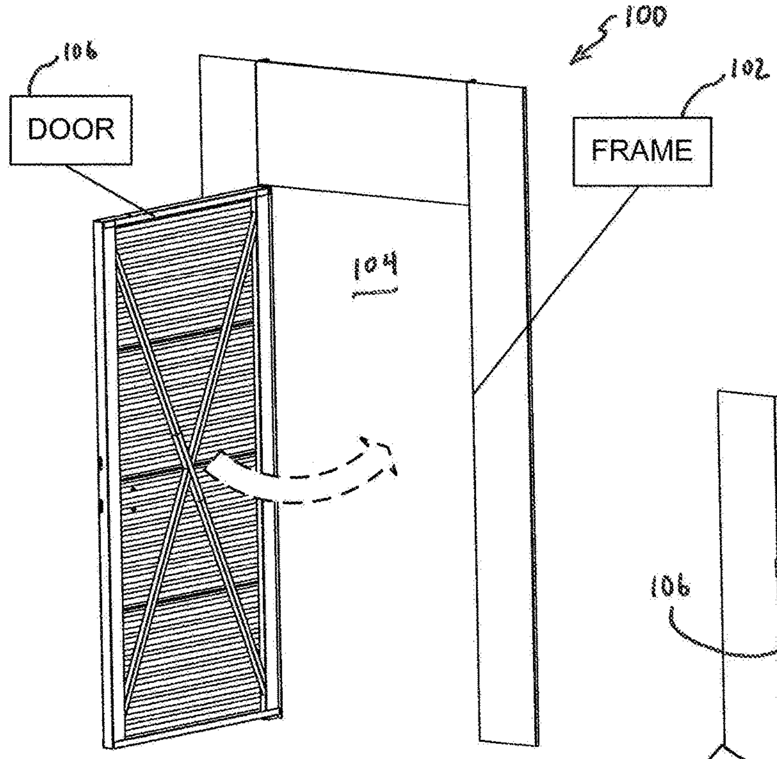
FIG. 1 is an outer perspective view of an entryway having a frame defining an opening and a door movable relative to the opening between an opened position, shown in FIG. 1, and a closed position, shown in FIG. 2.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

The foregoing terms as well as other terms should be broadly interpreted throughout this application to include all known as well as all hereafter discovered versions, equivalents, variations and other forms. The present disclosure is intended to be broadly interpreted and not limited.

Figure 2:
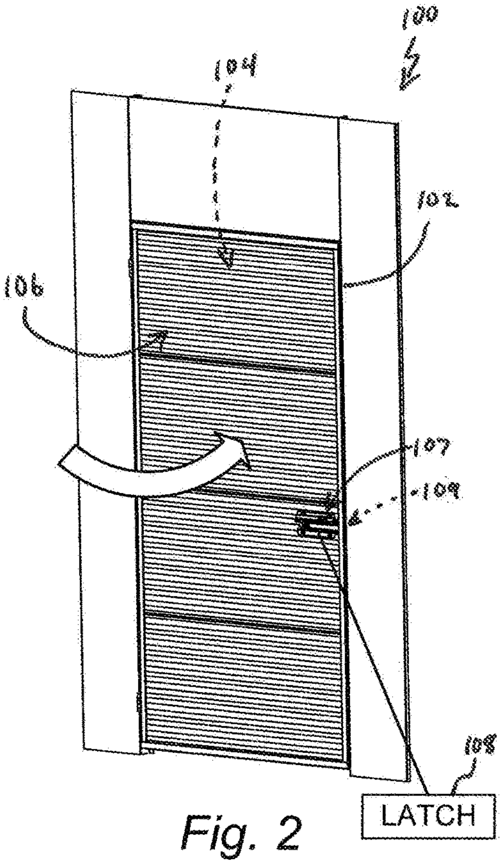
FIG. 2 is a view similar to FIG. 1 showing the door in the closed position and showing a latch according to one exemplary embodiment coupled to the door engaging with the frame to hold the door in the closed position at the selection of a user.
Figure 3:
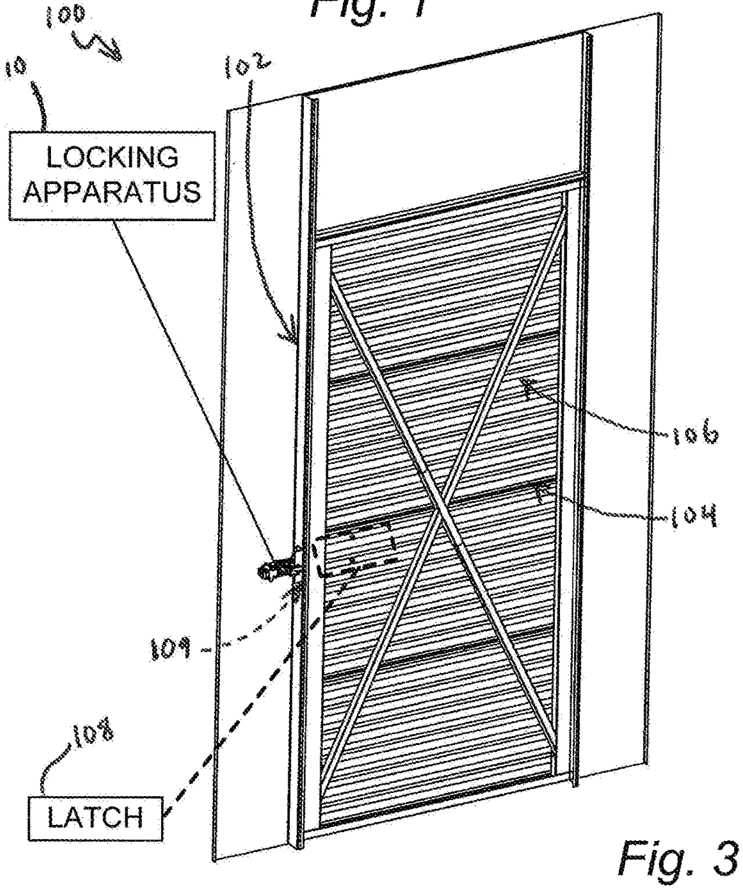
FIG. 3 is an inner perspective view of the entryway of FIG. 1 showing the door in the closed position and showing a locking apparatus in accordance with one exemplary embodiment of the present disclosure engaging with the latch to block operation of the latch and hold the door in the closed position at the selection of a user.

A first exemplary embodiment of a locking apparatus 10 in accordance with the present disclosure is useful for securing an entryway 100 as suggested in FIGS. 1-3. A latch 108 engages with a door 106 and a frame 102 of entryway 100 to block movement of door 106 relative to frame 102 as suggested in FIGS. 4 and 5. Locking apparatus 10 engages with latch 108 to block unauthorized operation of latch 108 and block access through entryway 100. Locking apparatus 10 is movable between an unlocked position for allowing access through entryway 100 and a locked position for blocking access through entryway as suggested in FIGS. 6-19.

An illustrative entryway 100 usable for entering and exiting a storage compartment, for example, is shown in FIG. 1. Entryway 100 includes a frame 102 defining an opening 104 and a door 106 secured to frame 102. In the illustrative embodiment, door 106 is a swing door movable relative to frame 102 between an opened position extending away from opening 104, as shown in FIG. 1, and a closed position covering opening 104, as shown in FIG. 2. Door 106 pivots relative to frame 102 between the opened and closed positions. In some embodiments, door 106 is a sliding or roll-up door movable between lowered (closed) and raised (opened) positions.

A latch 108 is coupled to door 106 and configured to engage with frame 102 to secure door 106 in the closed position at the selection of a user as shown in FIG. 2. Latch 108 is positioned on an exterior of entryway 100 to be accessible to a user for opening and closing door 106. In some embodiments, a lock (such as a padlock) can be engaged with latch 108 to block access through entryway 100 by unauthorized users. In the illustrative embodiment, latch 108 includes a cover plate 107 coupled to door 106 and a bolt 109 movable relative to cover plate 107 and door 106. Cover plate 107 holds bolt 109 on door 106 and blocks removal of bolt 109 from door 106 by an unauthorized user. Bolt 109 is moveable between a latched position extending across door 106 and frame 102 to engage with frame 102 and block movement of door 106 relative to frame 102 from the closed position to the opened position and an unlatched position spaced apart from frame 102 to allow door 106 to move to the opened position.

A locking apparatus 10 in accordance with the present disclosure is positioned on an interior of entryway 100 and inaccessible to unauthorized users as shown in FIG. 3. In the illustrative embodiment, locking apparatus 10 is coupled to frame 102 and configured to engage with latch 108 to block operation of latch 108 and hold door 106 in the closed position at the selection of an authorized user. Locking apparatus 10 is movable between a locked position, engaged with latch 108 and blocking access through entryway 100, and an unlocked position, allowing latch 108 to be operated and door 106 to be moved to the opened position. In exemplary embodiments, locking apparatus 10 is configured to communicate with an authorized key card, remote, or mobile device, for example, to move locking apparatus 10 from the locked position to the unlocked position. In some embodiments, operation of latch 108 moves locking apparatus 10 from the unlocked position to the locked position.

Figure 4:
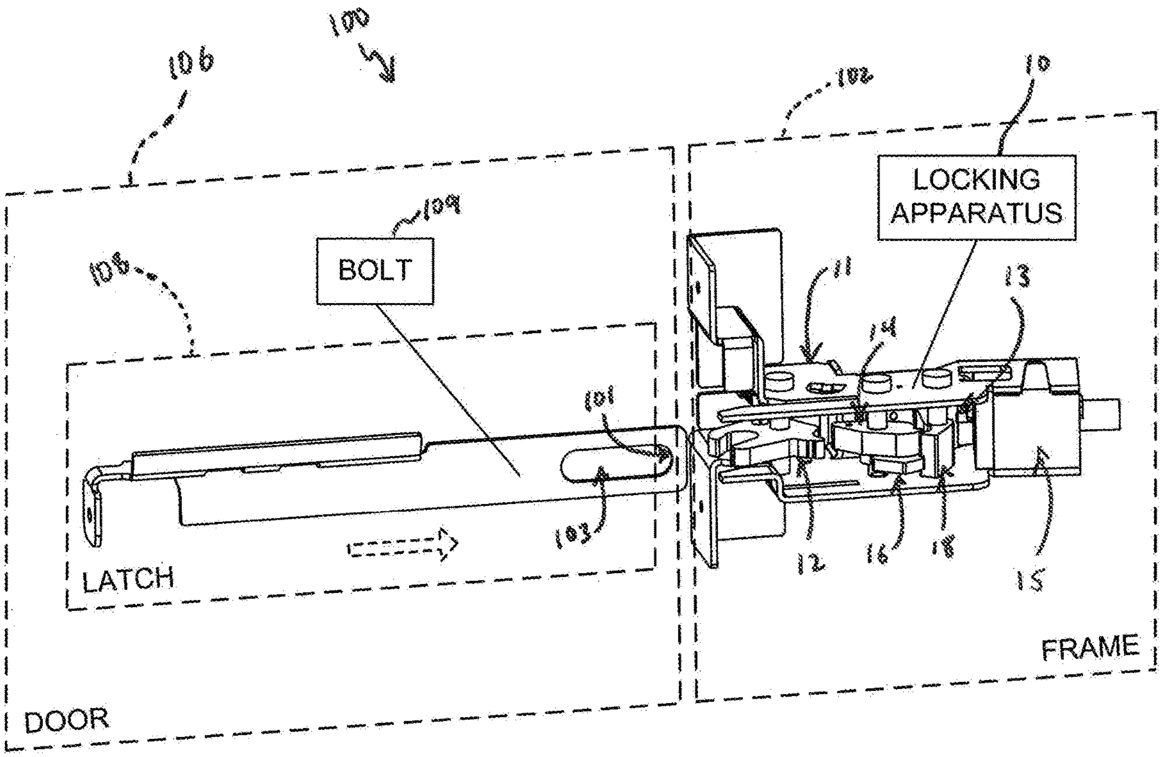
FIG. 4 is a diagrammatic view of the entryway of FIG. 1 showing a bolt of a latch according to exemplary embodiment, with the latch positioned for movement into a locking apparatus according to one exemplary embodiment and showing the locking apparatus in an unlocked position to receive a bolt.

Locking apparatus 10 is shown in the unlocked position and bolt 109 is shown in the unlatched position in FIG. 4. Bolt 109 is aligned with locking apparatus 10 when door 106 is in the closed position. A user moves bolt 109 relative to door 106 from the unlatched position to the latched position through a portion of frame 102 to engage with locking apparatus 10 as suggested in FIGS. 4 and 5. Locking apparatus 10 is shown in the locked position in FIG. 5. Bolt 109 extends across door 106 and frame 102 to block movement of door 106 relative to frame 102 in the latched position as suggested in FIG. 5.

Figure 5:
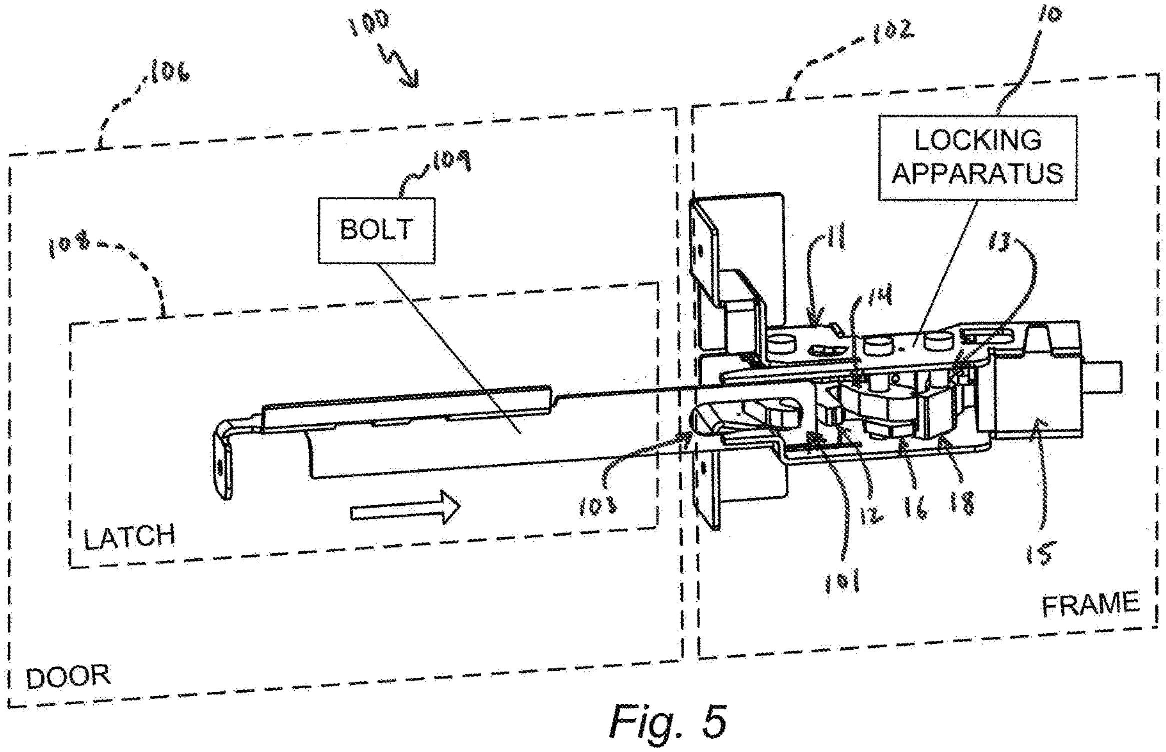
FIG. 5 is a view similar to FIG. 4 showing the bolt extending across the door and frame to block movement of the door relative to the frame and that the bolt is engaged with the locking apparatus and showing the locking apparatus in a locked position engaged with the bolt to block movement of the bolt at the selection of a user.

Locking apparatus 10 includes a case 11, a linkage 13 coupled to case 11, and a solenoid 15 coupled to case 11 as shown in FIGS. 4 and 5. Case 11 is coupled to frame 102 to hold locking apparatus 10 on frame 102. Operation of solenoid 15 allows linkage 13 to move from the locked position to the unlocked position.

In one exemplary embodiment, linkage 13 includes a catch 12, a cam 14, a trigger 16, and a release lever 18 as shown in FIGS. 4 and 5. A tip 101 of bolt 109 enters locking apparatus 10 as a user moves bolt 109 toward locking apparatus 10. Catch 12 engages with a slot 103 of bolt 109 in the locked position of locking mechanism 10 to block movement of bolt 109 away from locking apparatus 10 and block access through entryway 100 at the selection of an authorized user.

Figure 6:
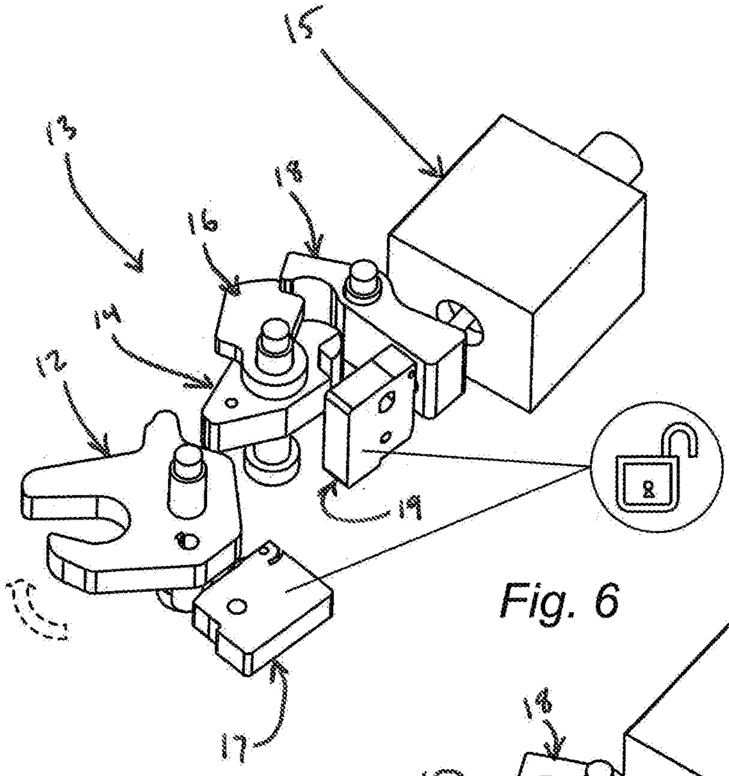
FIG. 6 is a lower perspective view of a linkage of the locking apparatus of FIG. 4 showing a catch of the linkage engaged with a first limit switch and a release lever of the linkage engaged with a second limit switch to signal that the locking apparatus is in the unlocked position.
Figure 7:
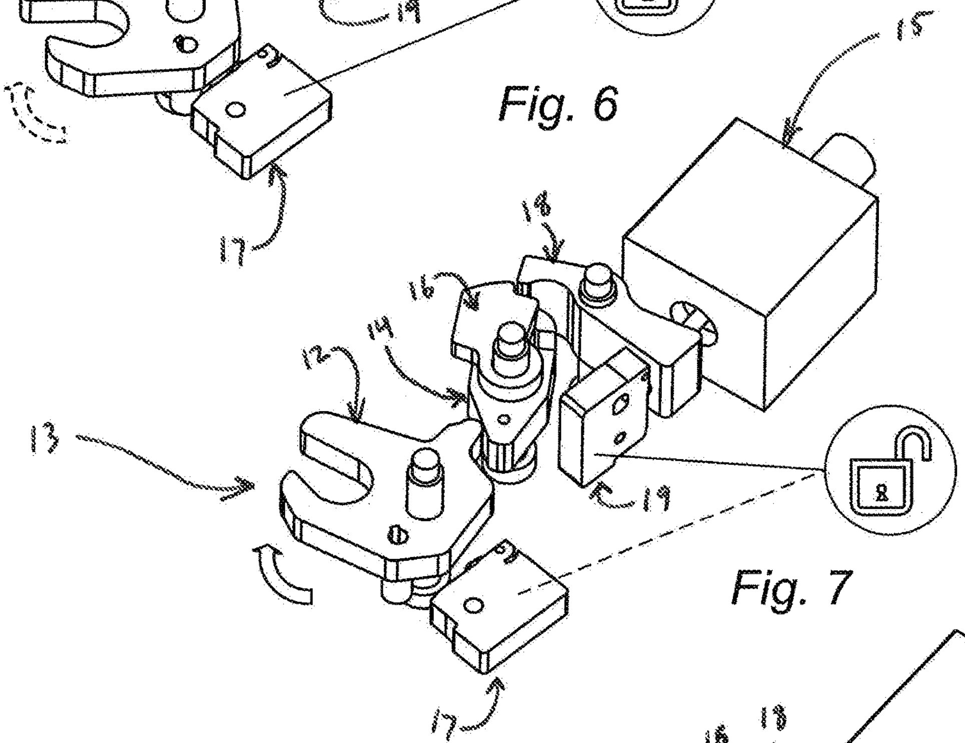
FIG. 7 is a view similar to FIG. 6 showing the catch rotated and spaced apart from the first limit switch and the release lever engaged with the second limit switch to signal that the locking apparatus is unlocked and in a transition position.
Figure 8:
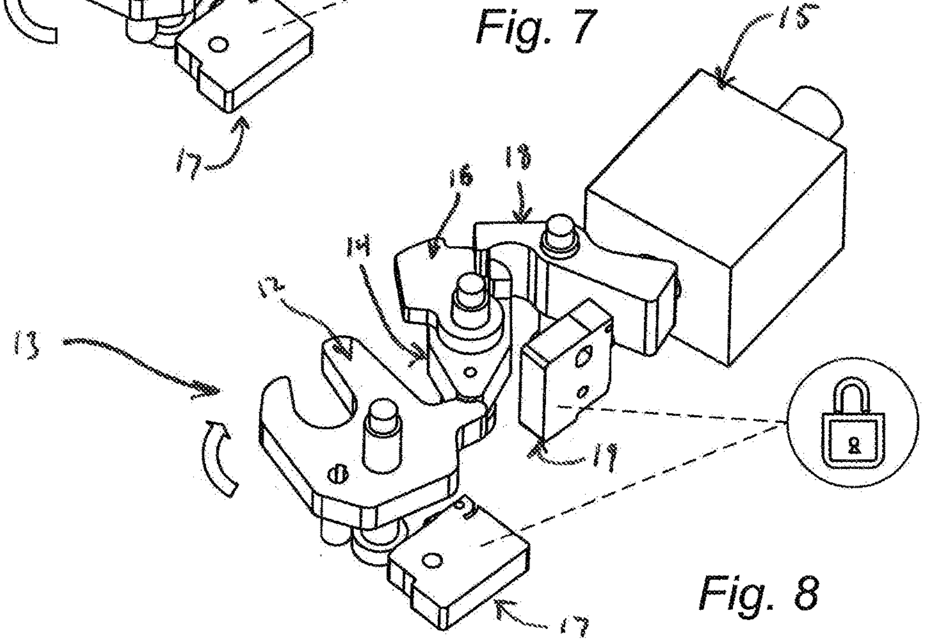
FIG. 8 is a view similar to FIG. 7 showing the release lever rotated and spaced apart from the second limit switch to signal that the locking apparatus is in the locked position.

A pair of limit switches 17, 19 are configured to engage with linkage 13 and signal a locked/unlocked status of locking apparatus 10 as suggested in FIGS. 6-8. Catch 12 engages with a first limit switch 17 and release lever 18 engages with a second limit switch 19 to signal that locking apparatus 10 is in the unlocked position as shown in FIG. 6. Catch 12 rotates and disengages from limit switch 17 as locking apparatus 10 moves to the locked position as suggested in FIG. 7. Locking apparatus 10 is shown in a transition position in FIG. 7 where catch 12 can return to the unlocked position without signaling locking apparatus 10 to unlock. Further rotation of catch 12 moves locking apparatus 10 into the locked position as shown in FIG. 8. Catch 12 is disengaged from first limit switch 17 and release lever 18 is disengaged from second limit switch 19 to signal that locking apparatus 10 is in the locked position.

Figure 9:
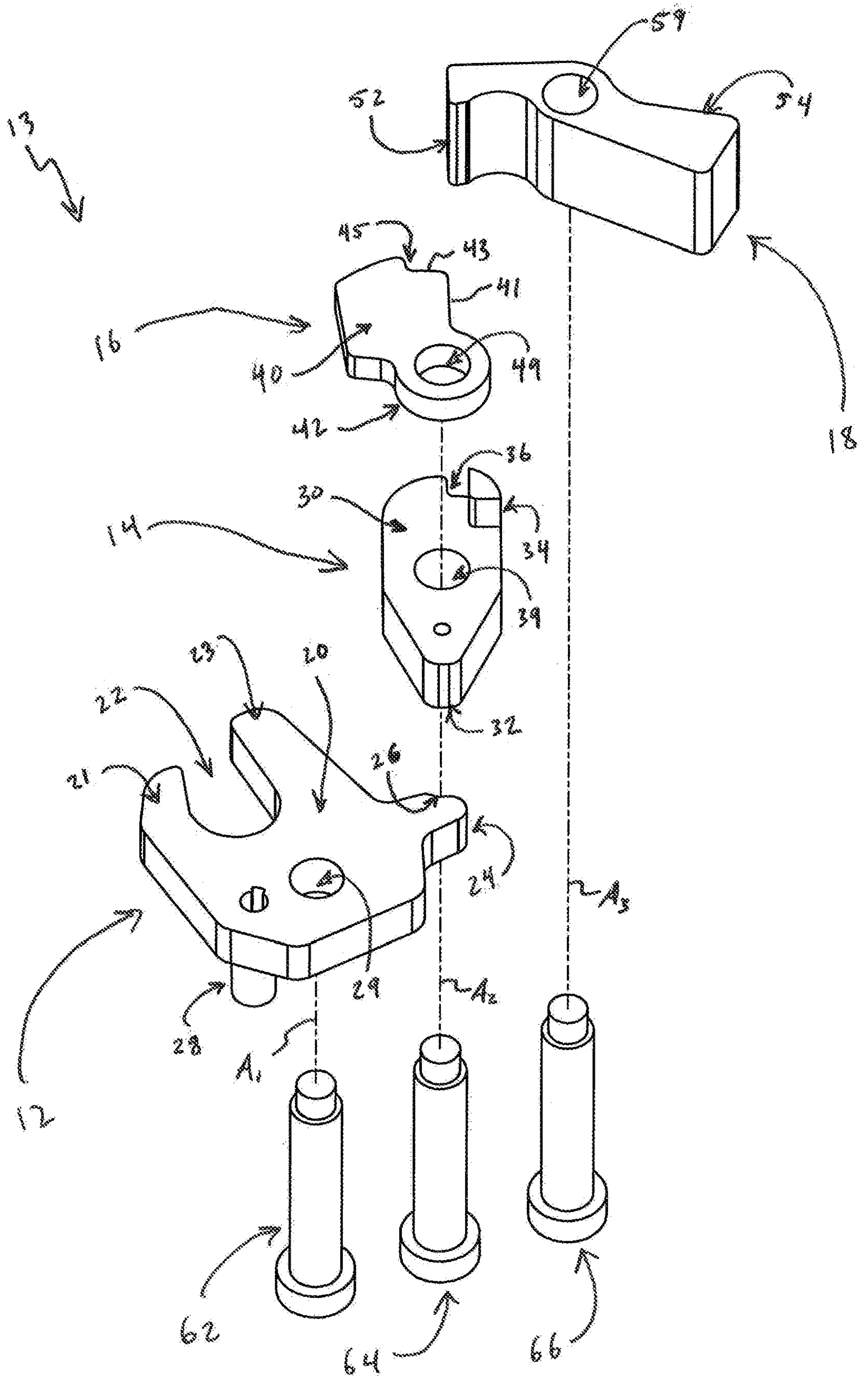
FIG. 9 is an exploded assembly view of the linkage of FIG. 8 showing details of linkage, including the catch, a cam, a trigger, and a release lever.

In one exemplary embodiment, catch 12 includes a body 20 and a projection 24 extending out from body 20 as shown in FIG. 9. A first finger 21 and a second spaced apart finger 23 extend out from body 20 to define a U-shaped slot 22. U-shaped slot 22 is spaced apart from projection 24. A seat 26 is formed into a distal end of projection 24. A pin 28 is coupled to body 20 for movement with body 20. A pin 62 extends through an opening 29 in body 20 to allow catch 12 to pivot about an axis $A_1$ through pin 62.

Cam 14 includes a body 30 and a lug 34 extending out from body 30 as shown in FIG. 9. Body 30 is formed to define a pointed nose 32 at a first end and a notch 36 at a second opposite end. A pin 64 extends through an opening 39 in body 30 to allow cam 14 to pivot about an axis $A_2$ through pin 64.

Trigger 16 includes a body 40 and a coupler 42 extending out from body 40 as shown in FIG. 9. Body 40 is formed to define a facing edge 41, a running edge 43, and a notch 45. Pin 64 extends through an opening 49 in coupler 40 to allow trigger 16 to pivot about axis $A_2$.

Release lever 18 includes a first end 52 and a spaced apart second end 54 as shown in FIG. 9. An opening 59 extends through releaser lever 18 between the first and second ends 52, 54. A pin 66 extends through opening 59 to allow release lever 18 to pivot about an axis $A_3$ through pin 66.

Figure 10:
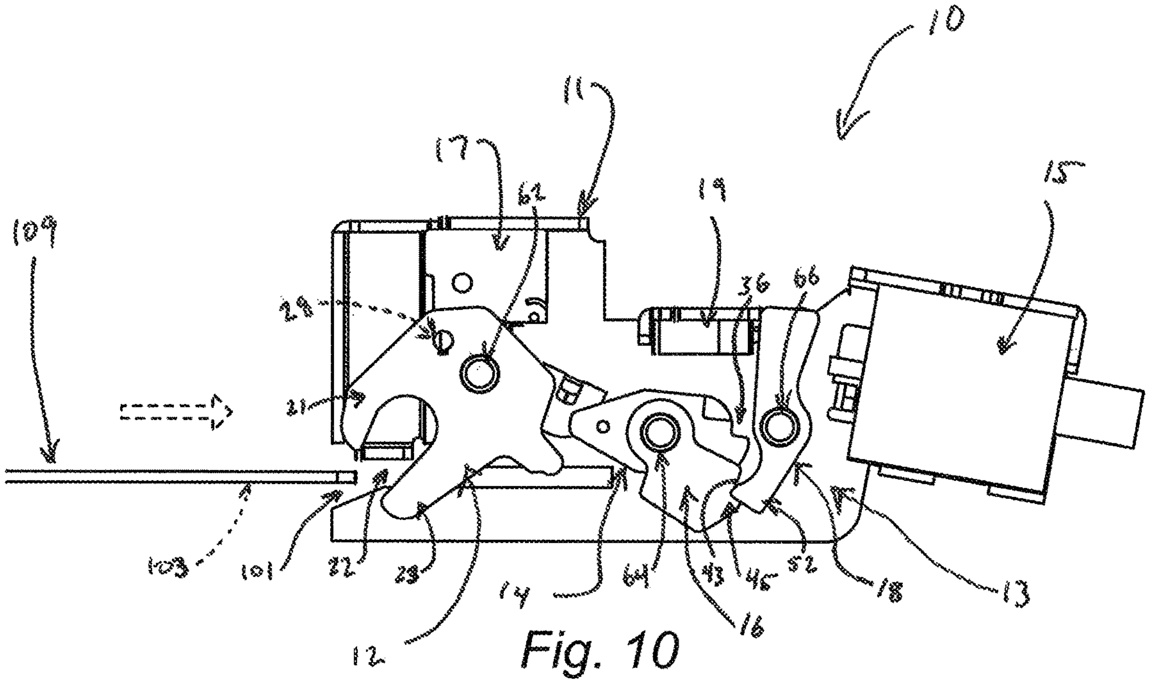
FIG. 10 is a side view showing the bolt in a first unlocked position (with further positions being shown in FIGS. 11-13) proximate to the locking apparatus, showing a process in accordance with the present disclosure for moving the locking apparatus from an unlocked position to a locked position.

In the unlocked position, first end 52 of release lever 18 is received in notch 45 of trigger 16 and spaced apart from notch 36 of cam 14 as shown in FIG. 10. Slot 22 of catch 12 is positioned to allow entry of bolt 109 into locking apparatus 10. Catch 12 is engaged with limit switch 17 and release lever 18 is engaged with limit switch 19. In some embodiments, linkage 13 is biased toward the unlocked position with one or more springs.

One exemplary embodiment of a process for moving locking apparatus 10 to the locked position is shown in FIGS. 10-13. Bolt 109 moves toward locking apparatus 10 (to the right in the perspective of FIG. 10) and engages with finger 23 of catch 12 to rotate catch 12 (counter-clockwise in the perspective of FIG. 10) relative to case 11 of locking apparatus 10 as suggested in FIGS. 10 and 11. Projection 24 of catch 12 engages with cam 14 to rotate cam 14 relative to case 11 (clockwise in the perspective of FIG. 11). Lug 34 of cam 14 engages with facing edge 41 of trigger 16 to rotate trigger 16 relative to case 11 with cam 14 (clockwise in the perspective of FIG. 11). First end 52 of release lever 18 rides along running edge 43 of trigger 16.

Figure 11:
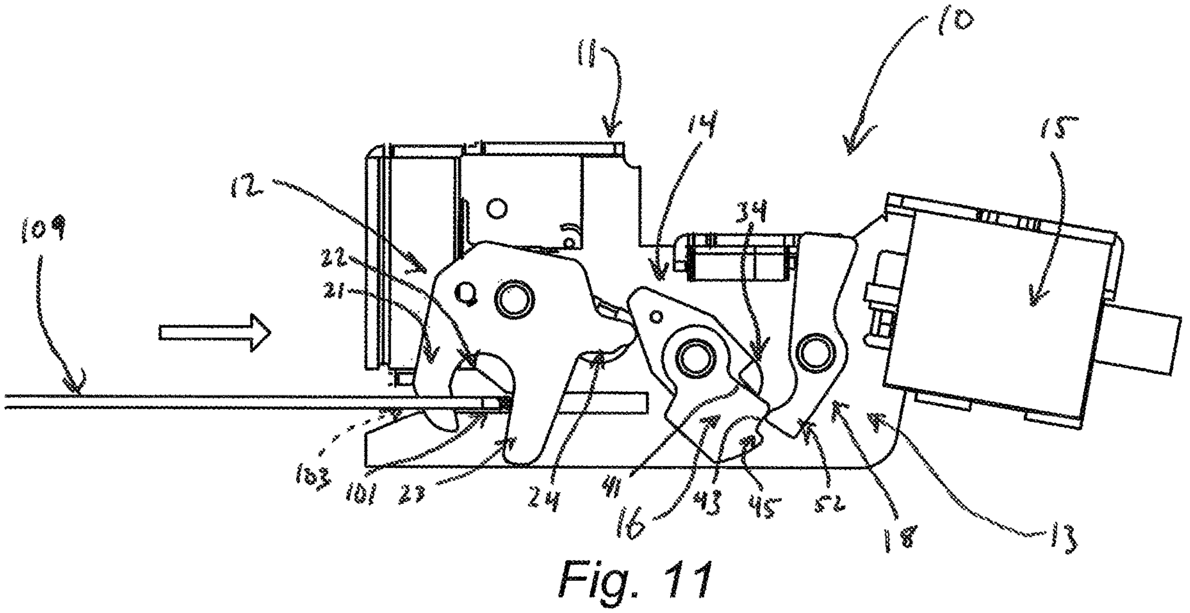
FIG. 11 is a side view showing the bolt in a second partially locked position.
Figure 12:
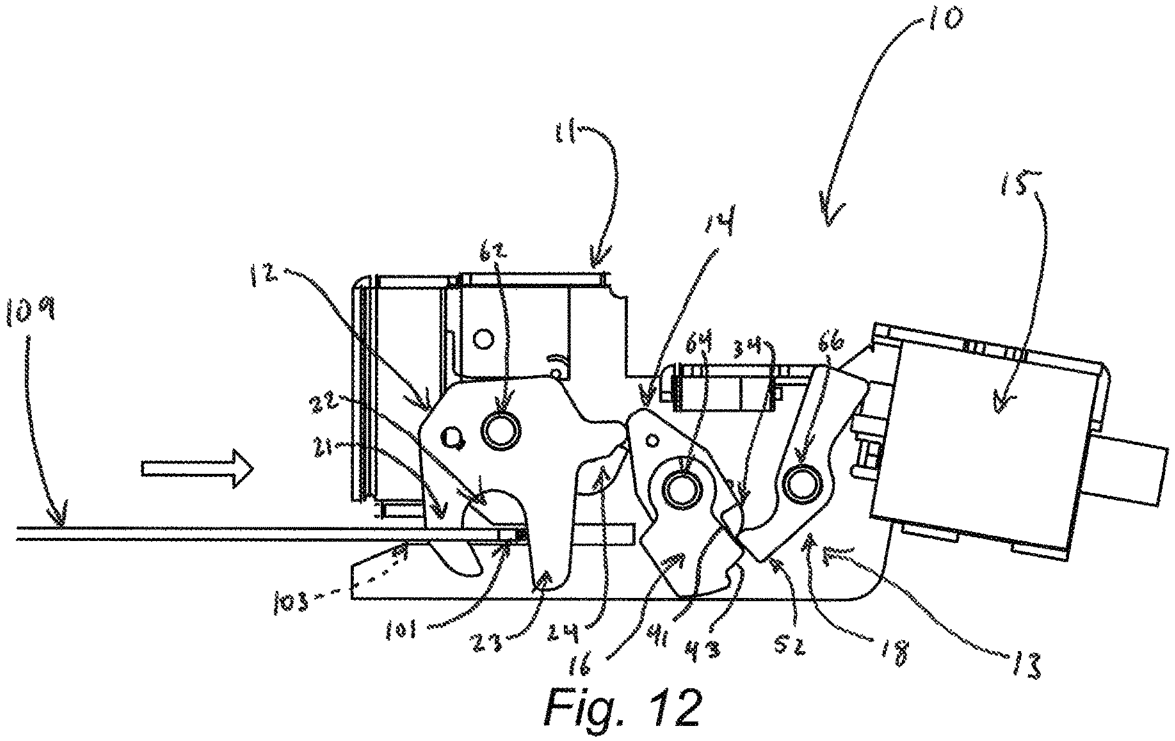
FIG. 12 is a side view showing the bolt in a third partially locked position.

Further rotation of catch 12 by bolt 109 moves linkage 13 further toward the locked position as suggested in FIGS. 11 and 12. First end 52 of release lever 18 moves off of running edge 43 of trigger 16 and engages with cam 14 with sufficient rotation of cam 14 and trigger 16 as shown in FIG. 12. Further rotation of catch 12 by bolt 109 moves linkage 13 to the locked position as suggested in FIGS. 12 and 13. Nose 32 of cam 14 engages with seat 26 of catch 12 to block rotation of catch 12 toward the unlocked position (clockwise in the perspective of FIG. 13). In some embodiments, projection 24 of catch 12 is formed without a seat 26 and has a smooth rounded surface, and projection 24 engages with nose 32 of cam 14 to block rotation of catch toward the unlocked position. First end 52 of release lever 18 engages with notch 36 of cam 14 and facing edge 41 of trigger 16 to block rotation of cam 14 and trigger 16 toward the unlocked position (counter-clockwise in the perspective of FIG. 13). Catch 12 is disengaged from first limit switch 17 and release lever 18 is disengaged from second limit switch 19 when locking apparatus 10 is in the locked position as shown in FIG. 13.

Figure 13:
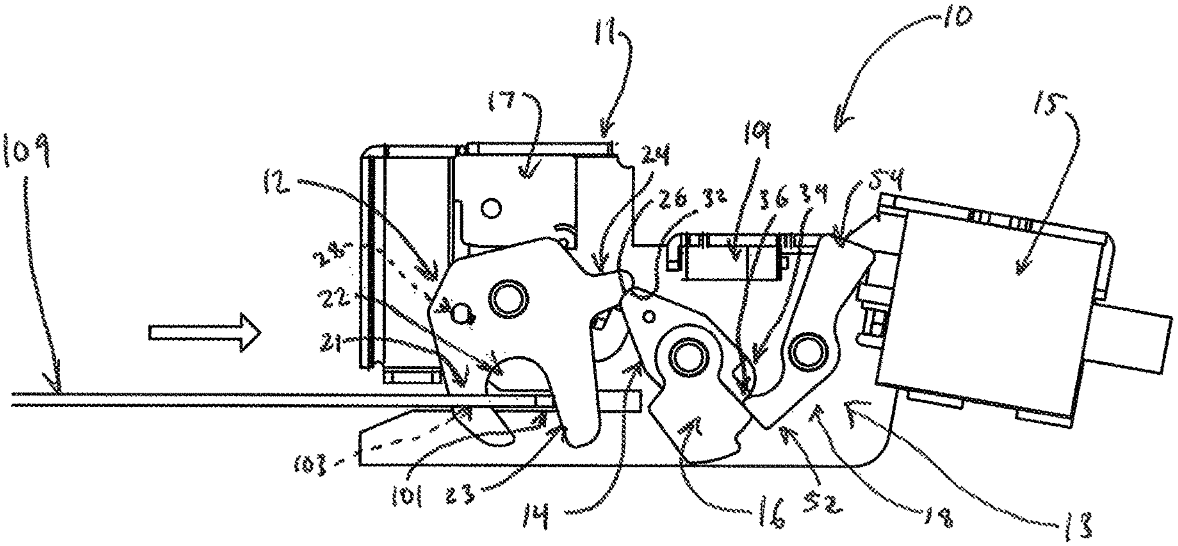
FIG. 13 is a side view showing the bolt in a fourth fully locked position.

Finger 21 of catch 12 passes through slot 103 of bolt 109 and engages with tip 101 to block removal of bolt 109 from locking apparatus 10 at the selection of an authorized user as suggested in FIG. 13. In the illustrative embodiment, the relative position of catch 12 and cam 14 allows a majority of forces acting between projection 24 and nose 32 to transmit through pin 64 rather than around pin 64. In other words, engagement of projection 24 with nose 32 presses cam 14 more against pin 64 than around pin 64. This can minimize forces acting on release lever 18 and maximize strength against unauthorized movement of bolt 109. In some embodiments, a resultant force vector between projection 24 and nose 32 in the locked position extends substantially toward axis $A_2$.

Figure 14:
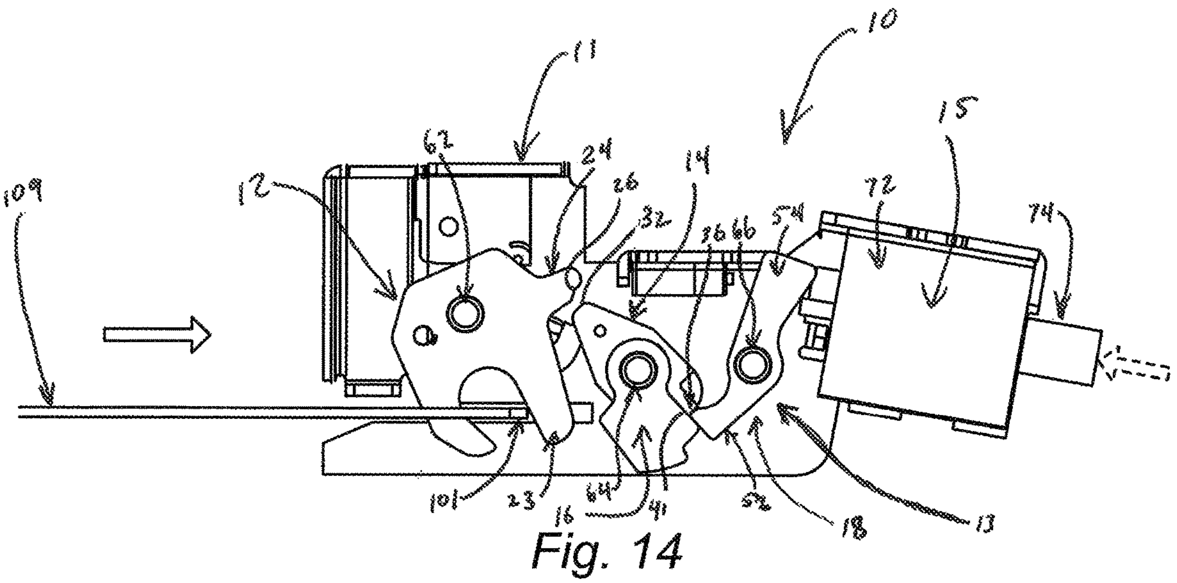
FIG. 14 is a side view showing the bolt in a first fully locked position (with further positions being shown in FIGS. 15-19) showing a process in accordance with the present disclosure for moving the locking apparatus from a locked position to an unlocked position.

One exemplary embodiment of a process for moving locking apparatus 10 to the unlocked position is shown in FIGS. 14-19. Catch 12 is rotated (counter-clockwise in the perspective of FIG. 14) to move nose 32 of cam 14 out of seat 26 of catch 12 as suggested in FIG. 14. In some embodiments, the unlocked position of locking apparatus 10 is as shown in FIG. 14 and seat 26 engages with nose 32 with unauthorized movement of bolt 109. In some embodiments, projection 24 of catch 12 is formed without a seat 26 and has a smooth rounded surface to allow nose 32 of cam 14 to slide along projection 24 such that catch 12 can rotate toward the unlocked position, as further described below, without the additional rotation of catch 12 suggested in FIG. 14. An authorized user signals locking apparatus 10 to unlock and solenoid 15 moves release lever 18 (counterclockwise in the perspective of FIG. 14) as suggested in FIGS. 14 and 15. Solenoid 15 includes a housing 72 and a piston 74. Piston 74 moves relative to housing 72 to engage with second end 54 of release lever 18. In some embodiments, piston 74 extends outward from housing 74 and is accessible to a user to manually move piston 74 relative to housing 72 and unlock locking apparatus 10.

Figure 15:
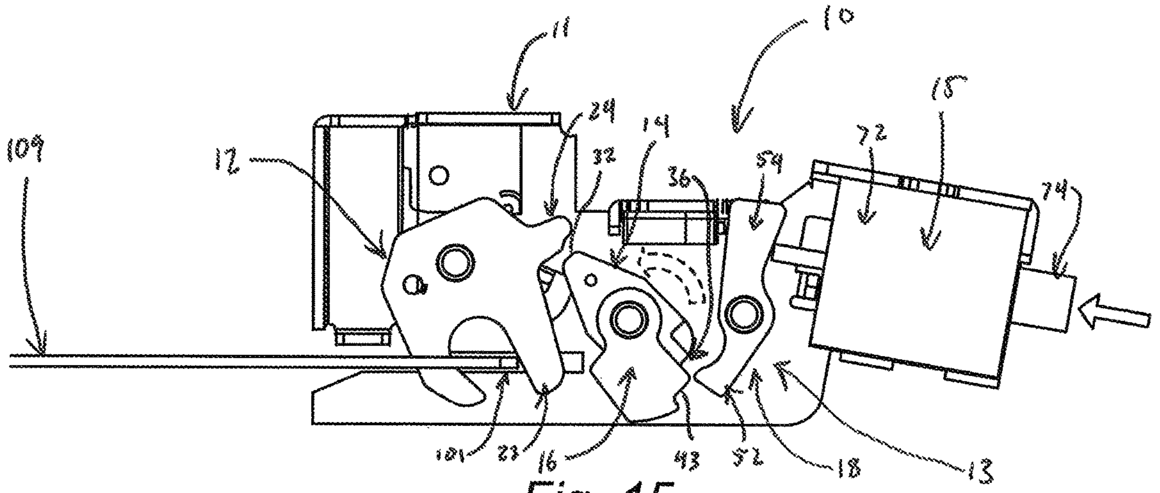
FIG. 15 is a side view showing the bolt in a second partially locked position.
Figure 16:
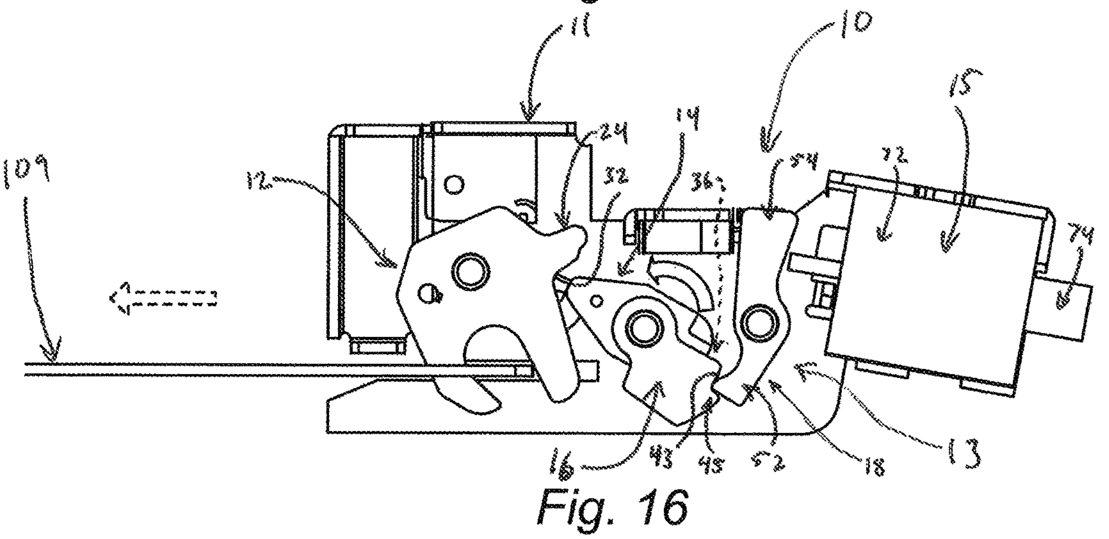
FIG. 16 is a side view showing the bolt in a third partially locked position.

Rotation of release lever 18 by solenoid 15 moves first end 52 of release lever 18 out of notch 36 of cam 14 and radially outward from running edge 43 of trigger 16 to allow cam 14 and trigger 16 to rotate toward the unlocked position as suggested in FIGS. 15 and 16. Nose 32 of cam 14 moves past projection 24 and toward finger 23 of catch 12 to allow catch 12 to rotate toward the unlocked position. First end 52 of release lever 18 engages with notch 45 of trigger 16 as shown in FIG. 16.

Figure 17:
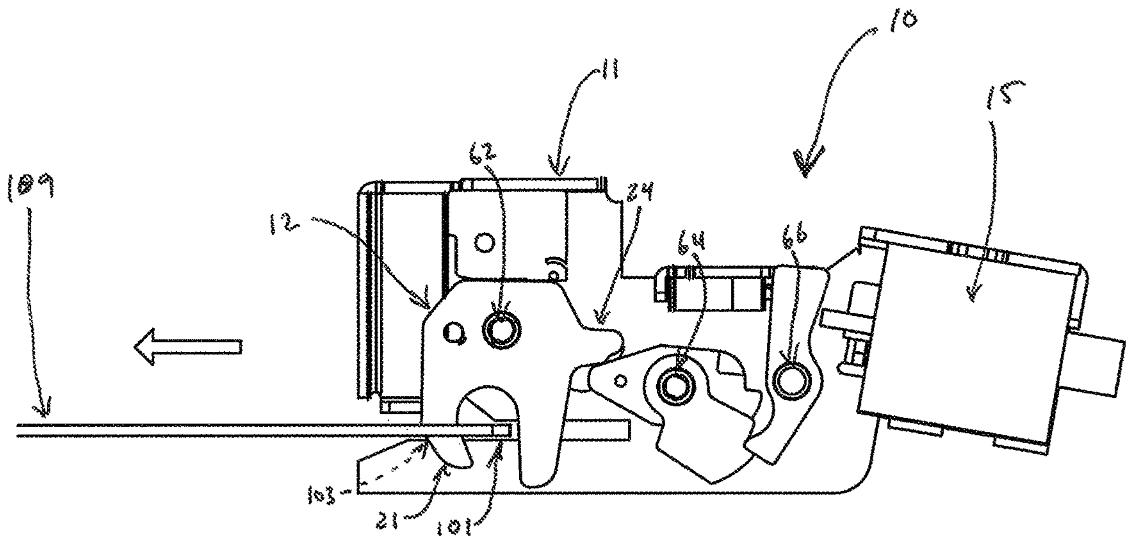
FIG. 17 is a side view showing the bolt in a fourth partially locked position.
Figure 18:
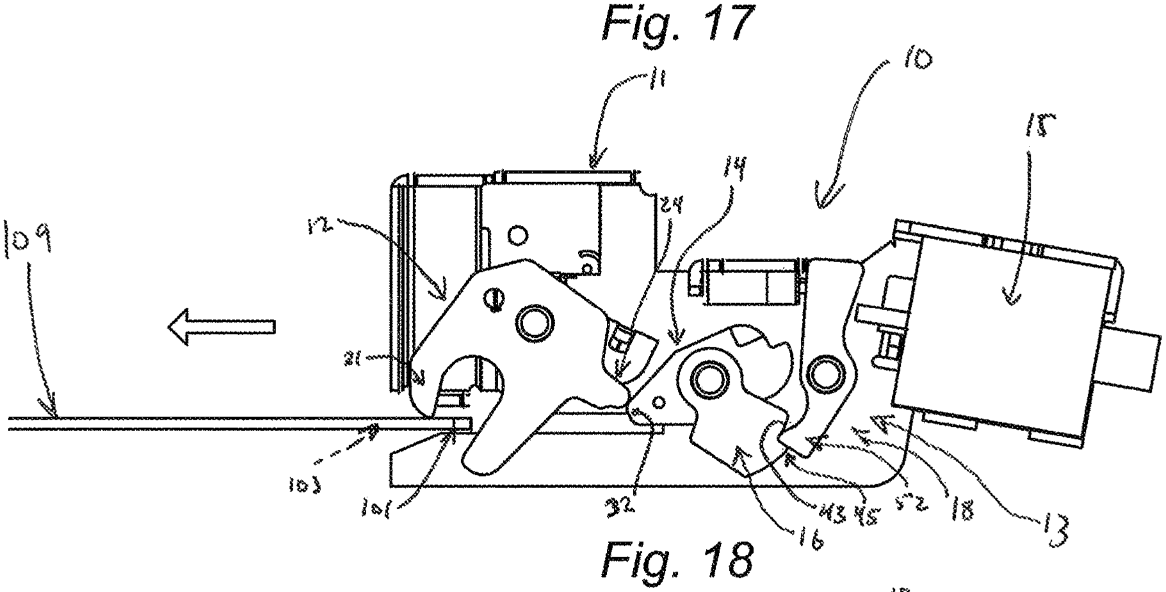
FIG. 18 is a side view showing the bolt in a fifth partially locked position.
Figure 19:
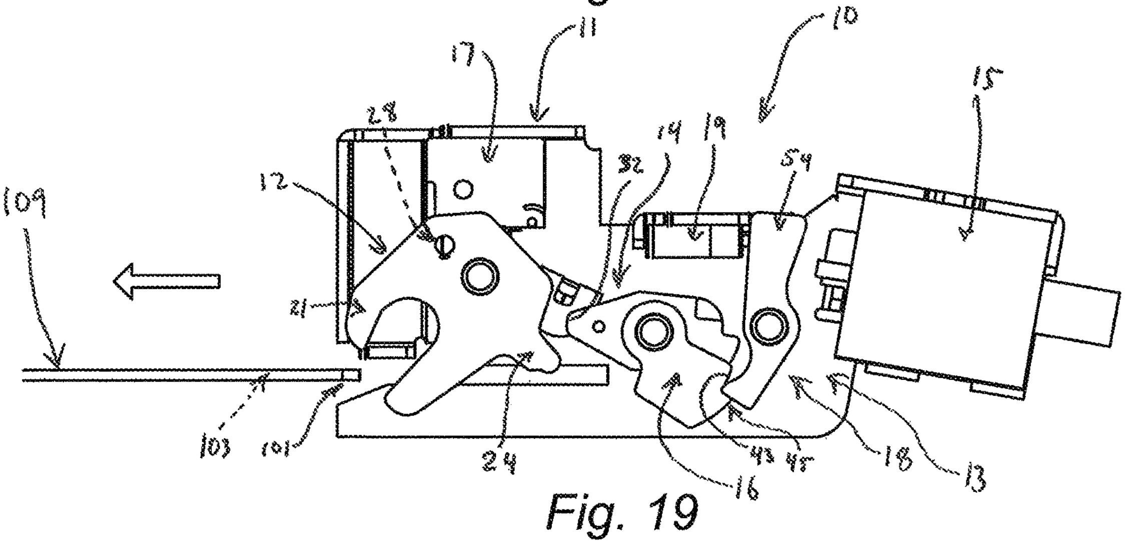
FIG. 19 is a side view showing the bolt in a sixth fully unlocked position.

Movement of bolt 109 (to the left in the perspective of FIG. 16) engages tip 101 with finger 21 of catch 12 to rotate catch 12 and engage projection 24 with cam 14 to rotate cam 14 as suggested in FIGS. 16 and 17. In the illustrative embodiment, cam 14 can rotate relative to trigger 16. Further movement of bolt 109 moves linkage 13 further toward the unlocked position as suggested in FIGS. 17-19. Catch 12 is engaged with first limit switch 17 and release lever 18 is engaged with second limit switch 19 when locking apparatus 10 is in the locked position as shown in FIG. 19.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The following numbered clauses include embodiments that are contemplated and non-limiting:

Clause 1: An electronic locking apparatus for an entryway, the entryway including a frame, a swing door adapted for swinging movement relative to the frame between an opened position extending away from an opening of the frame and a closed position covering the opening, and a latch coupled to the door, a bolt of the latch adapted to move relative to the door between a latched position extending across the door and the frame to engage with the frame and block movement of the swing door relative to the frame from the closed position to the opened position and an unlatched position spaced apart from the frame to allow the swing door to move to the opened position, the electronic locking apparatus comprising:

a. a case coupled to the frame;
b. a linkage coupled to the case and movable between a locked position blocking movement of the bolt from the latched position to the unlatched position and an unlocked position allowing movement of the bolt to the unlatched position; and,
c. a solenoid coupled to the case, wherein the solenoid is configured to engage with the linkage at the selection of an authorized user to allow the linkage to move from the locked position to the unlocked position.

Clause 2: The electronic locking apparatus of Claim 1, wherein the linkage includes a catch rotatable relative to the frame about a first axis, a cam rotatable relative to the frame about a second axis spaced apart from the first axis, and a release lever rotatable relative to the frame about a third axis spaced apart from the first and second axes.

Clause 3: The electronic locking apparatus of Claim 2, wherein the catch includes a body, a projection extending out from the body, and a pair of fingers extending out from the body to define a U-shaped slot, and wherein the U-shaped slot is spaced apart from the projection Clause 4: The electronic locking apparatus of Claim 3, wherein a seat is formed into a distal end of the projection and configured to receive a nose of the cam in the locked position to block rotation of the catch about the first axis.

Clause 5: The electronic locking apparatus of Claim 3, wherein the cam is formed to define a pointed nose at a first end and a notch at a second opposite end, and wherein the nose of the cam is configured to engage with a distal end of the projection of the catch to block rotation of the catch in the locked position.

Clause 6: The electronic locking apparatus of Claim 5, wherein the release lever includes a first end and a spaced apart second end, wherein the first end of the release lever engages with the notch of the cam in the locked position to block rotation of the cam toward the unlocked position, and wherein the solenoid is configured to engage with the second end of the release lever to rotate the release lever and remove the first end of the release lever from the notch of the cam to allow movement of the linkage to the unlocked position.

Clause 7: The electronic locking apparatus of Claim 6, further comprising a trigger rotatable relative to the frame about the second axis, wherein the cam engages with the trigger for movement of the trigger with the cam toward the locked position, and wherein the trigger engages with the release lever to block engagement of the release lever with the cam when the linkage is in the unlocked position.

Clause 8: The electronic locking apparatus of Claim 6, further comprising a first sensor and a second sensor, wherein the catch engages with the first sensor and the release lever engages with the second sensor to signal that the linkage is in the unlocked position, and wherein the catch is spaced apart from the first sensor and the release lever is spaced apart from the second sensor to signal that the linkage is in the locked position, Clause 9: The electronic locking apparatus of Claim 1, wherein the linkage is biased toward the unlocked position, and wherein movement of the bolt to the latched position moves the linkage to the locked position.

Clause 10: An entryway providing electronically controlled access, the entryway comprising:

a. a frame defining an opening through the frame,
b. a swing door adapted for swinging movement relative to the frame between an opened position extending away from the opening of the frame and a closed position covering the opening,
c. a latch coupled to the door, a bolt of the latch adapted to move relative to the door between a latched position extending across the door and the frame to engage with the frame and block movement of the swing door relative to the frame from the closed position to the opened position and an unlatched position spaced apart from the frame to allow the swing door to move to the opened position, and
d. an electronic locking apparatus comprising:
   (i) a case coupled to the frame;
   (ii) a linkage coupled to the case and movable between a locked position blocking movement of the bolt from the latched position to the unlatched position and an unlocked position allowing movement of the bolt to the unlatched position; and,
   (iii) a solenoid coupled to the case, wherein the solenoid is configured to engage with the linkage at the selection of an authorized user to allow the linkage to move from the locked position to the unlocked position.

Clause 11: The electronic locking apparatus of Claim 10, wherein the linkage includes a catch rotatable relative to the frame about a first axis, a cam rotatable relative to the frame about a second axis spaced apart from the first axis, and a release lever rotatable relative to the frame about a third axis spaced apart from the first and second axes.

Clause 12: The electronic locking apparatus of Claim 11, wherein the catch includes a body, a projection extending out from the body, and a pair of fingers extending out from the body to define a U-shaped slot, and wherein the U-shaped slot is spaced apart from the projection Clause 13: The electronic locking apparatus of Claim 12, wherein a seat is formed into a distal end of the projection and configured to receive a nose of the cam in the locked position to block rotation of the catch about the first axis.

Clause 14: The electronic locking apparatus of Claim 12, wherein the cam is formed to define a pointed nose at a first end and a notch at a second opposite end, and wherein the nose of the cam is configured to engage with a distal end of the projection of the catch to block rotation of the catch in the locked position.

Clause 15: The electronic locking apparatus of Claim 14, wherein the release lever includes a first end and a spaced apart second end, wherein the first end of the release lever engages with the notch of the cam in the locked position to block rotation of the cam toward the unlocked position, and wherein the solenoid is configured to engage with the second end of the release lever to rotate the release lever and remove the first end of the release lever from the notch of the cam to allow movement of the linkage to the unlocked position.

Clause 16: The electronic locking apparatus of Claim 15, further comprising a trigger rotatable relative to the frame about the second axis, wherein the cam engages with the trigger for movement of the trigger with the cam toward the locked position, and wherein the trigger engages with the release lever to block engagement of the release lever with the cam when the linkage is in the unlocked position.

Clause 17: The electronic locking apparatus of Claim 15, further comprising a first sensor and a second sensor, wherein the catch engages with the first sensor and the release lever engages with the second sensor to signal that the linkage is in the unlocked position, and wherein the catch is spaced apart from the first sensor and the release lever is spaced apart from the second sensor to signal that the linkage is in the locked position.

Clause 18: The electronic locking apparatus of Claim 10, wherein the linkage is biased toward the unlocked position, and wherein movement of the bolt to the latched position moves the linkage to the locked position.

What is claimed is:

1. An electronic locking apparatus for an entryway, the entryway including a frame, a swing door adapted for swinging movement relative to the frame between an opened position extending away from an opening of the frame and a closed position covering the opening, and a latch coupled to the door, a bolt of the latch operated to move from the door between a latched position extending across the door and the frame to engage with the frame and block movement of the swing door relative to the frame from the closed position to the opened position and an unlatched position spaced apart from the frame and moved back towards the door to allow the swing door to move to the opened position, the electronic locking apparatus comprising:

a case coupled to the frame;

a linkage coupled to the case and movable between a locked position blocking movement of the bolt out from the latched position to the unlatched position and an unlocked position allowing movement of the bolt to the unlatched position; and, a solenoid coupled to the case, wherein the solenoid is configured to engage with the linkage at the selection of an authorized user to allow the linkage to move from the locked position to the unlocked position, wherein the linkage includes a catch rotatable relative to the frame about a first axis, a cam rotatable relative to the frame about a second axis, and a release lever rotatable relative to the frame about a third axis, wherein each of the first, second, and third axes are parallel with and spaced apart from each other, and wherein a swing axis about which the swing door swings is parallel with the first, second, and third axes.

2. The electronic locking apparatus of claim 1, wherein the catch includes a body, a projection extending out from the body, and a pair of fingers extending out from the body to define a U-shaped slot, and wherein the U-shaped slot is spaced apart from the projection.

3. The electronic locking apparatus of claim 2, wherein a seat is formed into a distal end of the projection and configured to receive a nose of the cam in the locked position to block rotation of the catch about the first axis.

4. The electronic locking apparatus of claim 2, wherein the cam is formed to define a pointed nose at a first end and a notch at a second opposite end, and wherein the nose of the cam is configured to engage with a distal end of the projection of the catch to block rotation of the catch in the locked position.

5. The electronic locking apparatus of claim 4, wherein the release lever includes a first end and a spaced apart second end, wherein the first end of the release lever engages with the notch of the cam in the locked position to block rotation of the cam toward the unlocked position, and wherein the solenoid is configured to engage with the second end of the release lever to rotate the release lever and remove the first end of the release lever from the notch of the cam to allow movement of the linkage to the unlocked position.

6. The electronic locking apparatus of claim 5, further comprising a trigger rotatable relative to the frame about the second axis, wherein the cam engages with the trigger for movement of the trigger with the cam toward the locked position, and wherein the trigger engages with the release lever to block engagement of the release lever with the cam when the linkage is in the unlocked position.

7. The electronic locking apparatus of claim 5, further comprising a first sensor and a second sensor, wherein the catch engages with the first sensor and the release lever engages with the second sensor to signal that the linkage is in the unlocked position, and wherein the catch is spaced apart from the first sensor and the release lever is spaced apart from the second sensor to signal that the linkage is in the locked position.

8. The electronic locking apparatus of claim 1, wherein the linkage is biased toward the unlocked position, and wherein movement of the bolt to the latched position moves the linkage to the locked position.

9. The electronic locking apparatus of claim 1, wherein the bolt of the latch is arranged to move along a plane orientated orthogonal to the first axis.

10. The electronic locking apparatus of claim 1, wherein under engagement between the bolt of the latch in the closed position and the linkage in the locked position, a tip of the bolt is arranged within a slot of the catch with the catch rotated such that the slot is pointed at least partially away from the swing axis of the swing door.

11. An entryway providing electronically controlled access, the entryway comprising:

a frame having an opening defined therein;

a swing door adapted for swinging movement relative to the frame between an opened position extending away from the opening of the frame and a closed position covering the opening;

a latch coupled to the door, a bolt of the latch operated to move from the door between a latched position extending across the door and the frame to engage with the frame and block movement of the swing door relative to the frame from the closed position to the opened position and an unlatched position spaced apart from the frame and moved back towards the door to allow the swing door to move to the opened position; and an electronic locking apparatus comprising a case coupled to the frame;

a linkage coupled to the case and movable between a locked position blocking movement of the bolt from the latched position to the unlatched position and an unlocked position allowing movement of the bolt to the unlatched position; and, a solenoid coupled to the case, wherein the solenoid is configured to engage with the linkage at the selection of an authorized user to allow the linkage to move from the locked position to the unlocked position, wherein the linkage includes a catch rotatable relative to the frame about a first axis, a cam rotatable relative to the frame about a second axis, and a release lever rotatable relative to the frame about a third axis, wherein each of the first, second, and third axes are parallel with and spaced apart from each other, and wherein a swing axis about which the swing door swings is parallel with the first, second, and third axes.

12. The entryway of claim 11, wherein the catch includes a body, a projection extending out from the body, and a pair of fingers extending out from the body to define a U-shaped slot, and wherein the U-shaped slot is spaced apart from the projection.

13. The entryway of claim 12, wherein a seat is formed into a distal end of the projection and configured to receive a nose of the cam in the locked position to block rotation of the catch about the first axis.

14. The entryway of claim 12, wherein the cam is formed to define a pointed nose at a first end and a notch at a second opposite end, and wherein the nose of the cam is configured to engage with a distal end of the projection of the catch to block rotation of the catch in the locked position.

15. The entryway of claim 14, wherein the release lever includes a first end and a spaced apart second end, wherein the first end of the release lever engages with the notch of the cam in the locked position to block rotation of the cam toward the unlocked position, and wherein the solenoid is configured to engage with the second end of the release lever to rotate the release lever and remove the first end of the release lever from the notch of the cam to allow movement of the linkage to the unlocked position.

16. The entryway of claim 15, further comprising a trigger rotatable relative to the frame about the second axis, wherein the cam engages with the trigger for movement of the trigger with the cam toward the locked position, and wherein the trigger engages with the release lever to block engagement of the release lever with the cam when the linkage is in the unlocked position.

17. The entryway of claim 15, further comprising a first sensor and a second sensor, wherein the catch engages with the first sensor and the release lever engages with the second sensor to signal that the linkage is in the unlocked position, and wherein the catch is spaced apart from the first sensor and the release lever is spaced apart from the second sensor to signal that the linkage is in the locked position.

18. The entryway of claim 11, wherein the linkage is biased toward the unlocked position, and wherein movement of the bolt to the latched position moves the linkage to the locked position.

19. The entryway of claim 11, wherein the bolt of the latch is arranged to move along a plane orientated orthogonal to the first axis.

20. The entryway of claim 11, wherein under engagement between the bolt of the latch in the closed position and the linkage in the locked position, a tip of the bolt is arranged within a slot of the catch with the catch rotated such that the slot is pointed at least partially away from the swing axis of the swing door.

* * * * *